United States Patent
Watkins et al.

(10) Patent No.: US 11,493,904 B2
(45) Date of Patent: Nov. 8, 2022

(54) ERROR DISPLAY FOR INDUSTRIAL AUTOMATION COMPONENT

(71) Applicant: ROCKWELL AUTOMATION TECHNOLOGIES, INC., Mayfield Heights, OH (US)

(72) Inventors: Jerry M. Watkins, Franklin, WI (US); Kristopher J. Holley, Mequon, WI (US); Joseph A. Johnson, Hartford, WI (US); Darrell Filtz, Cedarburg, WI (US); Andrew E. Carlson, Oak Creek, WI (US); James P. Miller, Waterford, WI (US); Walied Khan, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 68 days.

(21) Appl. No.: 17/029,633

(22) Filed: Sep. 23, 2020

(65) Prior Publication Data
US 2022/0091592 A1 Mar. 24, 2022

(51) Int. Cl.
*G05B 19/418* (2006.01)
*G06T 7/00* (2017.01)
*G06K 19/06* (2006.01)

(52) U.S. Cl.
CPC ..... *G05B 19/4185* (2013.01); *G05B 19/4183* (2013.01); *G05B 19/41865* (2013.01); *G06K 19/06028* (2013.01); *G06T 7/0004* (2013.01)

(58) Field of Classification Search
CPC ............ G05B 19/4185; G05B 19/4183; G05B 19/41865; G06K 19/06028

USPC ........................................................ 235/494
See application file for complete search history.

(56) References Cited

U.S. PATENT DOCUMENTS

| | | | |
|---|---|---|---|
| 2005/0035600 A1 | 2/2005 | Albsmeier et al. | |
| 2010/0177070 A1 | 7/2010 | Zhu et al. | |
| 2013/0340304 A1 | 12/2013 | Cavazos et al. | |
| 2014/0131436 A1* | 5/2014 | Critchley | G01R 31/25 235/375 |

(Continued)

OTHER PUBLICATIONS ip.com search.*

(Continued)

*Primary Examiner* — Allyson N Trail
(74) *Attorney, Agent, or Firm* — Fletcher Yoder, P.C.

(57) ABSTRACT

A system includes an electrical enclosure, an industrial automation component disposed within the electrical enclosure, in which the industrial automation component is configured to receive external power from an external power source to perform an operation, a display configured to maintain presentation of image data in absence of the external power being received by the industrial automation component from the external power source, and a control system communicatively coupled to the industrial automation component and to the display. The control system is configured to perform operations that include receiving an indication that the external power is within a range of a threshold, in which the threshold is associated with an insufficient amount of power for the industrial automation component to operate, identifying an error associated with the industrial automation component in response to receiving the indication, and causing the display to render image data indicative of the error.

16 Claims, 6 Drawing Sheets

(56) References Cited

U.S. PATENT DOCUMENTS

| | | |
|---|---|---|
| 2016/0335237 A1 | 11/2016 | Mley et al. |
| 2018/0101089 A1* | 4/2018 | Hirayama .............. G03B 21/16 |
| 2018/0165814 A1* | 6/2018 | Gulati .................... G06T 7/001 |
| 2019/0057626 A1 | 2/2019 | Lee et al. |
| 2020/0295222 A1 | 9/2020 | Telfer et al. |
| 2021/0066013 A1 | 3/2021 | Kumar et al. |
| 2021/0306572 A1* | 9/2021 | Ouchi ................... H04N 5/243 |

OTHER PUBLICATIONS

Atom Power, 2020 Atom Power, Inc., https://www.atompower.com/.

C. Moretti, et al., "Electrochromic Textile Displays for Personal Communication", Smart Textiles and Their Applications, pp. 539-568, Dec. 2016, https://doi.org/10.1016/B978-0-08-100574-3.00024-2.

* cited by examiner

ERROR DISPLAY FOR INDUSTRIAL AUTOMATION COMPONENT

BACKGROUND

The disclosure relates generally to industrial automation components. More particularly, embodiments of the present disclosure are related to a persistent display of an industrial automation component.

This section is intended to introduce the reader to various aspects of art that may be related to various aspects of the present techniques and are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

An industrial automation system may have various industrial automation components that operate to perform functions for the industrial automation system. For example, one of the industrial automation components may use electricity in order to operate, and an industrial automation component having a display may draw electricity from a power source to illuminate a display or render an image on the display. However, reliance on electricity may increase costs associated with operating the industrial automation system. Further, the operation of the industrial automation system may be limited during events in which electricity is limited or unavailable, such as during power outages. Accordingly, it is desirable for certain features of an industrial automation component to function without having to consume significant amounts of electricity or other type of power.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes an electrical enclosure, an industrial automation component disposed within the electrical enclosure, in which the industrial automation component is configured to receive external power from an external power source to perform an operation, a display configured to maintain presentation of image data in absence of the external power being received by the industrial automation component from the external power source, and a control system communicatively coupled to the industrial automation component and to the display. The control system is configured to perform operations that include receiving an indication that the external power is within a range of a threshold, in which the threshold is associated with an insufficient amount of power for the industrial automation component to operate, identifying an error associated with the industrial automation component in response to receiving the indication, and causing the display to render image data indicative of the error.

In an embodiment, an industrial automation component includes a display configured to render image data and to maintain presentation of image data in absence of power and a control system communicatively coupled to the display. The control system is configured to use power from a power source to perform operations that include identifying an error associated with the industrial automation component, and causing the display to render image data based on the error. The image data includes a visualization configured to cause a computing device, upon acquiring the image data, to access a database to retrieve information associated with industrial automation component.

In an embodiment, a system includes a plurality of industrial automation components, a plurality of displays, in which each display is configured to render image data and to maintain presentation of image data in absence of power, and a control system configured to receive external power from an external power source to drive operation of at least one of the plurality of industrial automation components. The control system is configured to perform operations that include identifying an error associated with an industrial automation component of the plurality of industrial automation components and using the external power to coordinate a set of the plurality of displays to render respective image data based on the error associated with the industrial automation component.

DRAWINGS

These and other features, aspects, and advantages of the present disclosure will become better understood when the following detailed description is read with reference to the accompanying drawings in which like characters represent like parts throughout the drawings, wherein.

Figure 10:
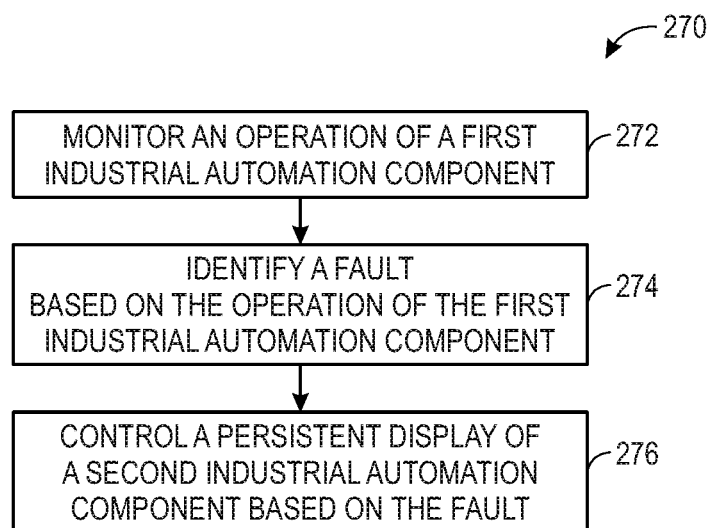
Figure 11:
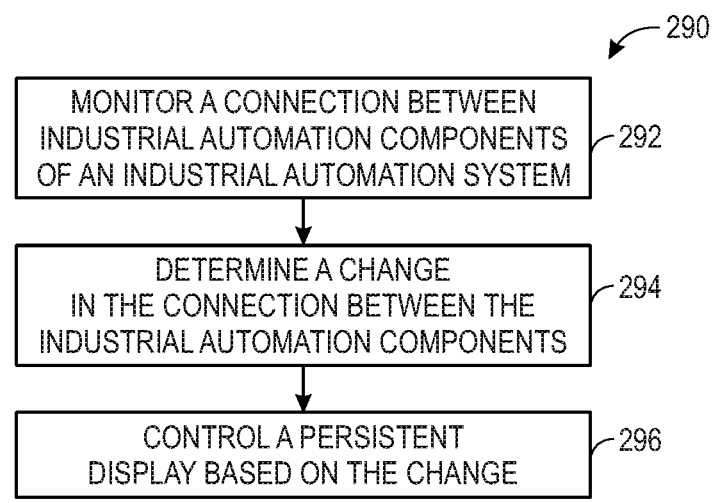

FIG. 10 is a flowchart of an embodiment of a process for controlling the persistent display of a first industrial automation component based on an operation of a second industrial automation component, in accordance with an embodiment of the present disclosure; and FIG. 11 is a flowchart of an embodiment of a process for controlling the persistent display of the industrial automation component shown in FIGS. 1-4 based on connections between industrial automation components in the industrial automation system, in accordance with an embodiment of the present disclosure.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Displays are used in various applications to present certain information. For example, in industrial automation systems, a display may present information associated with an operation of an industrial automation component or an industrial automation device of the industrial automation system. A user may utilize the display to identify various appropriate actions that may be taken in regard to the industrial automation component. By way of example, the display may present operational information, product or specification information, servicing information, fault or error information, flags, and other valuable information that helps the user with determining an appropriate manner in which to operate, modify, install, and/or remove the industrial automation component. The display may be able to present different types of information and/or different combinations of information. For instance, based on a user input indicative of requested information, the display may be updated to present the requested information to the user.

Unfortunately, certain displays that emit light to render an image (e.g., a liquid crystal display, a light emitting diode display, an organic light emitting diode display, a plasma display, a quantum dot display, an electroluminescent display, a light-emitting display) may be difficult to implement and/or operate. For example, a substantial amount of power may be needed to enable the display to operate and present information. Thus, additional components, such as a power source and/or wiring, may be implemented to provide sufficient power to operate the display. Such components may increase a physical footprint occupied by the industrial automation component and/or may increase a complexity associated with the installation and/or operation of the industrial automation component (e.g., the electrical connection between the industrial automation component and other industrial automation components). Further, a constant flow of power may be used to maintain illumination and operation of the display. As such, there is an increased cost associated with the operation of the display. Additionally, during situations in which no power is available to operate the display, such as during an electrical blackout and/or when an industrial automation component is powered down or shut down, the display may no longer function. Therefore, in such situations, the user may not have access to certain information presented by the display, and it may be more difficult for the user to determine a suitable action to be performed with respect to the industrial automation component. For example, if the industrial automation component experiences a fault or error that causes the industrial automation component to be powered down, there may not be power available to enable the display to present information associated with the fault. In this way, it may be difficult for the user to identify and/or to address the fault.

Thus, it is therefore recognized that there is a need to improve the display associated with an industrial automation component. Accordingly, the present disclosure is directed to using a persistent display to present information. As used herein, a persistent display (e.g., a persistent electronic display) refers to any suitable technique utilizing the reflection of light, instead of the emitting of light, in order to display image data (e.g., visualizations) while consuming little or no power (e.g., 1-5 milliamperes per refresh of image data). For example, an industrial automation component may receive electrical power to perform an operation, but the persistent display may not have to use such electrical power and/or may use a low amount of electrical power from a different power source (e.g., a stored electrical power) to maintain presentation of image data. Rather, some electrical power may merely be used to adjust the image data presented by the persistent display. Thus, the persistent display may maintain presentation of the image data independently of the power used to operate the industrial automation component. Indeed, in some embodiments, the persistent display may use electrophoretic display techniques to position reflective particles in a desirable arrangement in order to reflect light in a manner that presents a target image data. Thus, the persistent display may continue to present information even when power is not readily provided or available to operate the industrial automation component.

The present disclosure includes an overview of various techniques associated with implementation and operation of a persistent display for an industrial automation component. As an example, power may be extracted from various power or voltage sources to enable operation of the persistent display. Such power may be received from an external power source (e.g., a power source that is not integral to the industrial automation component and that provides power to enable the industrial automation component to perform other operations), an internal power source (e.g., a feature of the industrial automation component that may harvest power from an external power source), and/or a stored power source (e.g., a power reserve that does not supply power until needed). The persistent display may be used to present various information associated with an industrial automation component and/or an industrial automation system. In some embodiments, a control system is communicatively coupled to the persistent display, and the control system may instruct the persistent display to present certain information, such as an operational condition, product information, an identifier, fault information, and the like. The control system may also update the persistent display. For instance, the control system may monitor a parameter associated with the industrial automation component and/or the industrial automation system, and the control system may instruct the persistent display to present certain information based on the monitored parameter. Indeed, the control system may control the persistent display to better facilitate the user performing an appropriate action. It should be noted that although the present disclosure discusses usage of the persistent display in an industrial application, the techniques described herein may be applied to a component used in any other suitable context.

Figure 1:
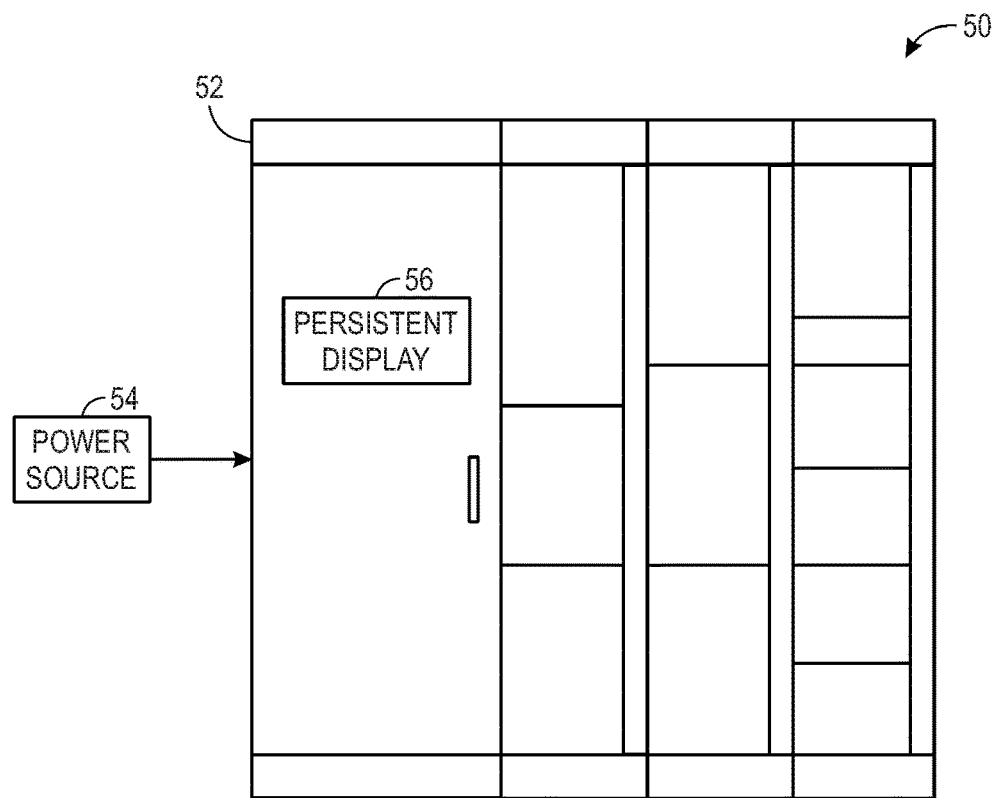
FIG. 1 is a front view of an embodiment of an industrial automation system in a closed configuration, in accordance with an embodiment of the present disclosure.

With the preceding in mind, FIG. 1 is a schematic diagram of an embodiment of an industrial automation system 50 that may include various industrial automation components that operate to enable the industrial automation system 50 to perform a function. As an example, the industrial automation system 50 may include industrial automation components, such as a motor, a motor starter, a motor drive, a relay (e.g., an electronic overload relay), a switch, a fuse, a circuit breaker, a control system (e.g., an electronic controller), a fan, a bus bar, a sensor, an input/output (I/O) module, a conveyor, a contactor, a scanner, a valve, a flow meter, a compressor, a user interface, a gateway device, a router, a communication component, and the like. Indeed, the industrial automation components may interact (e.g., communicate) with one another in order to collectively and cooperatively enable the industrial automation system 50 to operate. Although the illustrated industrial automation system 50 (e.g., a motor control center) includes an enclosure 52 that may contain at least some of the industrial automation components, an additional industrial automation system 50 may not include the enclosure 52, and the industrial automation components may be arranged in an open volume of space, such as on an industrial platform. In particular, the illustrated industrial automation system 50 is in a closed configuration in which the enclosure 52 (e.g., doors, panels, cabinets, drawers) enclose industrial automation components positioned internally within the enclosure 52. For example, the closed configuration of the industrial automation system 50 may block exposure of the internal industrial automation components, thereby sealing off and/or protecting the internal industrial automation components from an ambient environment.

In some embodiments, the industrial automation system 50 may receive power from a power or voltage source 54 to operate. The power source 54 may include, for example, a battery, a generator, a transformer, a connection to power provided by a utility company, or some other source of power. For instance, the power may include electrical power that provides power to certain industrial automation components (e.g., electromechanical components) of the industrial automation system 50 to enable the industrial automation components to operate. That is, the industrial automation components may utilize the electrical power received from the power source 54 to operate. In such embodiments, at least some of the industrial automation components may not be able to operate without the electrical power. Accordingly, if the power source 54 does not successfully provide electrical power to the industrial automation system 50 (e.g., during a power outage), the industrial automation system 50 may also have limited or no operation.

Further, in certain embodiments, it may be desirable for the industrial automation system 50 to present certain information to a user, such as via a display. By way of example, the display may present a specification sheet (e.g., product information), an operational status, an annotated description, historical information, and the like, to a user (e.g., an operator, a technician) to facilitate the user interacting with any of the industrial automation components, such as to control operation of the industrial automation component, to perform maintenance of the industrial automation component, to modify the industrial automation component, and so forth. Though aforementioned displays that emit light may provide certain benefits when used with industrial automation components, significant power consumption by these displays may result in drawbacks when implementing these displays into the industrial automation system 50 in situations in which power is limited or otherwise at a premium. Further, it may be difficult to arrange the display in a manner that is presentable to the user in the closed configuration of the industrial automation system 50. Indeed, the enclosure 52 may include a limited amount of exterior space in which the display may be positioned to enable the user to readily view the information presented by the display. Further, the coupling between the display and another industrial automation component (e.g., via wiring) may increase a complexity associated with the industrial automation system 50. As another example, it may be expensive and/or complex to install and/or operate a light-emitting display. For instance, certain displays that are off the shelf or otherwise readily available for implementation may include other features, such as interactive components, that increase a size and/or a cost of the display, but such features may not be needed for purposes of operating the industrial automation system 50. As a further example, the light-emitting display may require power from the power source 54 in order to function. As such, when the power source 54 is not providing power to the industrial automation system 50, the display may not operate.

For this reason, the industrial automation system 50 may use an electronic paper or an electronic ink persistent display 56 instead of a display that emits light. The persistent display 56 may be more easily implemented into the industrial automation system 50 as compared to a display that emits light. Indeed, the persistent display 56 may be smaller in size compared to a display that emits light and may be easily positioned at any suitable location, such as at an exterior surface, of the industrial automation system 50. Further, the persistent display 56 may be able to operate and present information without receiving power from the power source 54 (e.g., during a disconnection or an electrical uncoupling between a voltage provided by the power source 54 and the persistent display 56). Indeed, the persistent display 56 may continue to present information in a steady state without receiving power from the power source 54, and/or the persistent display 56 may utilize stored power from a different power source to present information. In any case, a cost associated with operation of the persistent display 56 may be less than that associated with operation of a display that emits light.

Figure 2:
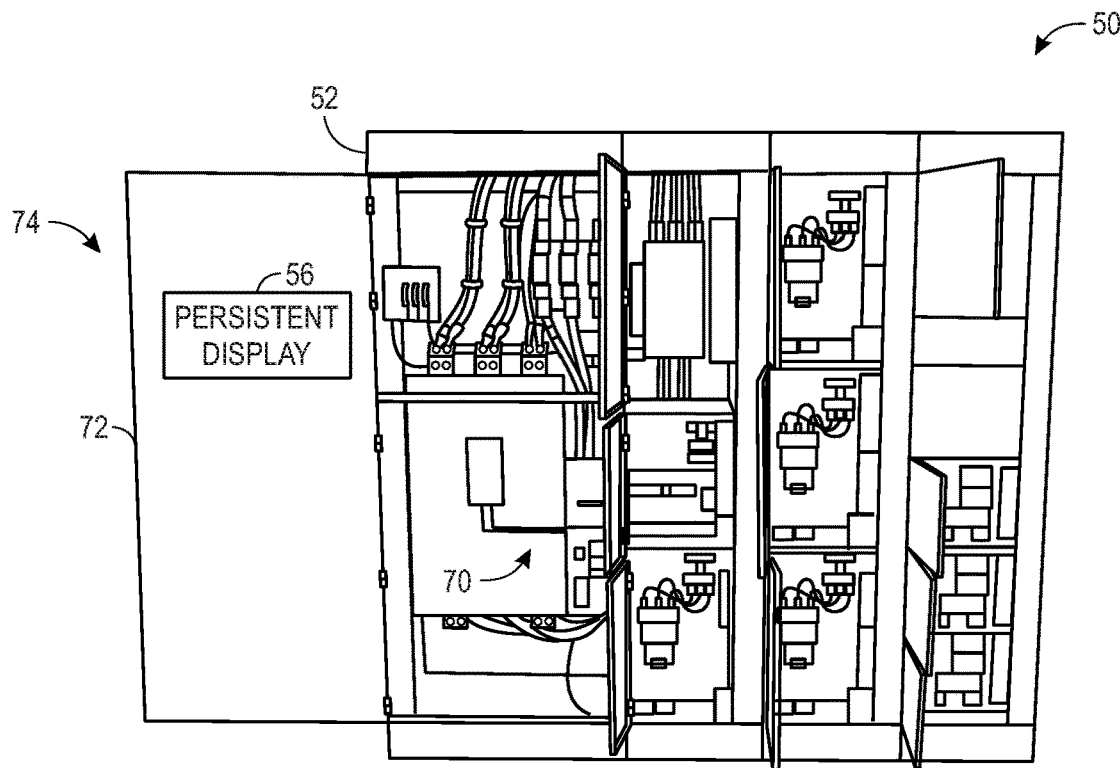
FIG. 2 is a front view of an embodiment of the industrial automation system of FIG. 1 in an open configuration, in accordance with an embodiment of the present disclosure.

FIG. 2 is an embodiment of the industrial automation system 50 in an open configuration in which features of the industrial automation system 50 are arranged to expose internal industrial automation components 70 (e.g., a motor, a relay, a motor drive, a switch) to the ambient environment. For instance, the industrial automation system 50 may be transitioned to the open configuration to enable a user to access the internal industrial automation components 70, such as for installation, maintenance, modification, and the like. In some embodiments, the industrial automation system 50 may include multiple internal sections where certain industrial automation components 70 are grouped. Indeed, the industrial automation components 70 may substantially fill the volumes of the internal sections, and each internal section may therefore include little or no volume to accommodate a display that emits light. However, the persistent display 56 may be more easily arranged in an appropriate location to enable the user to readily view information presented by the persistent display 56 in the open configuration of the industrial automation system 50. In the illustrated example, the persistent display 56 is positioned on an interior surface 72 of a panel 74 of the industrial automation system 50. As such, the user may be able to view the information presented by the persistent display 56 while accessing various industrial automation components 70, such as industrial automation components 70 positioned in an internal volume that the panel 74 may cover in the closed configuration of the industrial automation system 50.

In additional embodiments, the persistent display 56 may be easily moved between a position that is exterior to the enclosure 52 and a position that is interior of the enclosure 52. As an example, the persistent display 56 may be flexibly connected to one of the industrial automation components 70 to enable the persistent display 56 to be moved to various positions without affecting operation of the persistent display 56. Thus, the user may utilize the same persistent display 56 in the closed configuration and in the open configuration of the industrial automation system 50. In this way, a limited number of persistent displays 56 may be installed in the industrial automation system 50 to enable the user to view various information, thereby limiting a cost of operating and/or manufacturing the industrial automation system 50.

Figure 3:
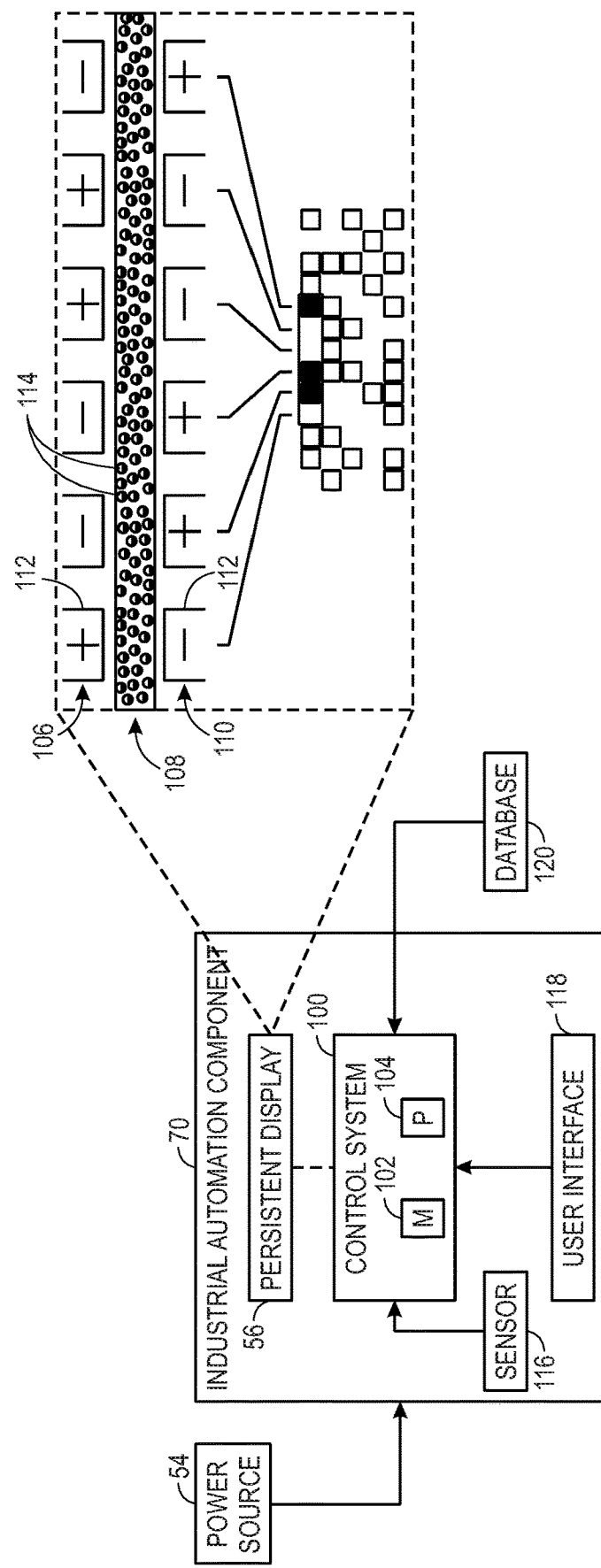
FIG. 3 is a schematic diagram of an embodiment of the industrial automation component of FIGS. 1 and 2 having a persistent display, in accordance with an embodiment of the present disclosure.

FIG. 3 is a schematic diagram of one of the industrial automation components 70 that may use the persistent display 56 to present information associated with the industrial automation component 70, such as information directly related to the industrial automation component 70, information related to another industrial automation component that is associated with (e.g., electrically coupled to) the industrial automation component 70, and/or information related to the industrial automation system 50 that includes the industrial automation component 70. The persistent display 56 may, for instance, be located on an exterior surface of a housing of the industrial automation component 70 to enable a user to view the image data presented by the persistent display 56. In the illustrated embodiment, the industrial automation component 70 may include a control system 100 that may perform various operations associated with the industrial automation component 70. For example, the control system 100 may enable the industrial automation component to perform an operation for the industrial automation system 50. Furthermore, the control system 100 may control operation of the persistent display 56, such as to generate visualizations for display on the persistent display 56 and/or to transmit a signal that instructs the persistent display 56 to present visualizations represented by certain image data. To this end, the control system 100 may include a memory 102 and processing circuitry 104. The memory 102 may include volatile memory, such as random-access memory (RAM), and/or non-volatile memory, such as read-only memory (ROM), optical drives, hard disc drives, solid-state drives, or any other non-transitory computer-readable medium that includes instructions executable by the processing circuitry 104. The processing circuitry 104 may include one or more application specific integrated circuits (ASICs), one or more field programmable gate arrays (FPGAs), one or more general purpose processors, or any combination thereof, that may execute the instructions stored in the memory 102 to control operation of the industrial automation component 70. As an example, the industrial automation component 70 may receive power from the power source 54, and the power may drive operation of the control system 100.

In certain embodiments, the power source 54 may not include an auxiliary power source (e.g., an external power source dedicated to enable a specific operation of the industrial automation component 70), and the industrial automation component 70 may be self-powered. That is, the industrial automation component 70 may operate in the absence of power from an auxiliary power source. As an example, the power source 54 may include stored, harvested, or generated power, such as from a device or component internal to the industrial automation component 70, from a light source, from a mechanical user input, and so forth. As another example, the power source 54 may include a power supply that is already being used by the industrial system 50 in which the industrial automation component 70 is implemented. For instance, the industrial automation component 70 may include a self-powered relay or other protection device that is electrically coupled to another industrial automation component (e.g., a transformer) of the industrial system 50 via an electrical connection (e.g., an electrical line or circuit). The other industrial automation component may receive energy from a power source, and the relay may receive energy conducted through the electrical connection (e.g., a portion of the electricity passing through the other industrial automation component) to operate, such as to drive operation of the control system 100. However, the industrial automation component 70 may not receive power while the other industrial automation component does not receive power. Indeed, an auxiliary power source may provide power to the other industrial automation component, but the auxiliary power source may not directly provide power (e.g., a voltage) to the industrial automation component 70 to enable operation of the industrial automation component 70.

In the illustrated embodiment, the persistent display 56 utilizes an electrophoretic technique to present information. For example, the persistent display 56 may include a first layer 106, a second layer 108, and a third layer 110. The first layer 106 and the third layer 110 may include electrodes 112 that align with one another at opposite sides of the second layer 108. The second layer 108 may include a container that encloses particles 114, such as titanium dioxide, that are electrically charged. A dark-colored fluid (e.g., oil with dark-colored dye) within the container of the second layer 108 may submerge the particles 114. The control system 100 may control the charge of the electrodes 112 by using received voltage (e.g., from the power source 54) to implement a positive and/or a negative charge, and the charge of the electrodes 112 may control movement and positioning of the particles 114 within the container of the second layer 108. For example, the particles 114 (e.g., positively charged particles) may move toward electrodes 112 having a first charge (e.g., a negative charge) and away from electrodes 112 having a second charge (e.g., a positive charge) opposite the first charge. The positioning of the particles 114 may control a visibility or appearance of pixels seen by the user. For instance, the first layer 106 may be transparent, and the particles 114 may reflect light (e.g., light emitted through the first layer 106) when positioned more adjacent to the first layer 106 than to the third layer 110. Thus, in sections where the particles 114 are positioned more adjacent to the first layer 106 than to the third layer 110, the particles 114 may reflect light to cause the user to see a white or otherwise colorless appearance. However, in sections where the particles 114 are positioned more adjacent to the third layer 110 than to the first layer 106, the dark-colored fluid is positioned adjacent to the first layer 106 and may absorb light emitted through the first layer 106, thereby causing the user to see a dark appearance. In this manner, the positioning of the particles 114 at various sections will provide an appearance of pixels (e.g., black and white pixels) arranged to present image data to the user, such as of text and/or symbols, thereby enabling the presentation of information to the user.

In this described embodiment, the control system 100 may operate the persistent display 56 (e.g., via power supplied by the power source 54) to adjust the charge of the electrodes 112, thereby adjusting the positioning of the particles 114 within the second layer 108 (e.g., relative to the first layer 106 and to the third layer 110) and adjusting the image data presented by the persistent display 56. For instance, the control system 100 may be able to use a low voltage or power (e.g., 10 microwatts) to adjust the image data presented by the persistent display 56. However, the control system 100 may not have to operate to maintain the charge of the electrodes 112 and maintain the positioning of the particles 114 within the second layer 108. Accordingly, little or no power may be needed to maintain the image data presented by the persistent display 56. As such, the persistent display 56 may continue to present information independently of the power received from the power source 54, such as when the industrial automation component 70 does not receive power from the power source 54 (e.g., during a power outage and/or during a shutdown status of the industrial automation component 70). It should also be noted that the persistent display 56 may also use any other suitable technique for presenting information via the persistent display 56, such as using a microencapsulated electrophoretic technique having particles of different colors, using color filters to present colored image data, using an electrowetting technique to control a shape of a water/oil interface via an applied voltage, or any combination thereof.

In some embodiments, the control system 100 may control the persistent display 56 based on sensor data received from a sensor 116, which may be integral to and/or communicatively coupled to the industrial automation component 70. By way of example, the sensor 116 may monitor a parameter associated with the industrial automation component 70, such as an operating status of the industrial automation component 70, an operating status of another industrial automation component (e.g., a different industrial automation component coupled to the industrial automation component 70), an operating status of the industrial automation system 50 that includes the industrial automation component 70, another suitable parameter, or any combination thereof. In this way, the control system 100 may receive the sensor data from the sensor 116, determine target image data to be displayed by the persistent display 56 based on the received sensor data, and then instruct the persistent display 56 (e.g., by charging the electrodes 112) to present image data based on the target image data. In additional embodiments, the industrial automation component 70 may include and/or be communicatively coupled to a user interface or other input component 118 with which a user may interact. In some embodiments, the persistent display 56 and the user interface 118 may be the same component or integrated into the same components. In other embodiments, the persistent display 56 and the user interface 118 may be separate components. For example, the user interface 118 may include a touchscreen (e.g., as a part of the persistent display 56), a button, a knob, a switch, a dial, a trackpad, a gesture or motion-controlled interface, a physical controller (e.g., a joystick), or any other suitable feature. The user may utilize the user interface 118 to transmit a user input to the control system 100. The control system 100 may then utilize the user input to determine target image data to be presented by the persistent display 56 and to instruct the persistent display 56 to present image data based on the target image data. As an example, the user may utilize the user interface 118 to transmit a request to cycle through various information associated with the industrial automation component 70, and the control system 100 may therefore instruct the persistent display 56 to change the information presented by the persistent display 56. Indeed, some of the information requested by the user may be determined by the sensor 116, and the control system 100 may therefore use both the sensor data received by the sensor 116 and the user input received via the user interface 118 to control the persistent display 56.

In additional embodiments, the control system 100 may be communicatively coupled to a database 120 (e.g., stored on a physical server or a cloud-based storage medium) and may instruct the persistent display 56 to present image data based on information stored in the database 120. For instance, the database 120 may store information (e.g., certification information, product information) associated with the industrial automation component 70 and/or the industrial automation system 50, and such information may change over time. The control system 100 may access the database 120 to retrieve the stored information and may instruct the persistent display 56 to present image data based on the retrieved information. As the stored information updates or changes within the database 120, such as based on a user input or another suitable indication, the control system 100 may retrieve the updated information and may therefore instruct the persistent display 56 to present updated image data. In an example, the database 120 may store information associated with multiple industrial automation components 70 and/or multiple industrial automation systems 50, each of which may be communicatively coupled to the database 120 and may include a respective persistent display 56 that presents information retrieved from the database 120. Updating the information stored in the database 120 may cause multiple persistent displays 56 to update their respectively presented image data without having to manually modify or operate one or more control systems 100 that control the respective persistent displays 56 to present updated image data.

As described above, although the control system 100, and therefore some power, may be used to adjust the image data presented by the persistent display 56, little or no power may be consumed to maintain the image data presented by the persistent display 56. That is, after the control system 100 has controlled the persistent display 56 to present desirable image data, the control system 100 may no longer communicate with the persistent display 56 until different image data is to be presented by the persistent display 56 (e.g., based on updated sensor data received from the sensor 116, based on a user input received via the user interface 118). Accordingly, the persistent display 56 may continue to present the image data independently of the power received by the control system 100, such as without communicating with the control system 100, without usage of power received from the power source 54, or both. Thus, even when the industrial automation component 70 does not receive power from the power source 54, the persistent display 56 may continue to present information to a user, thereby facilitating the user with interacting with the industrial automation component 70 even when the industrial automation component 70 is not in operation.

Figure 4:
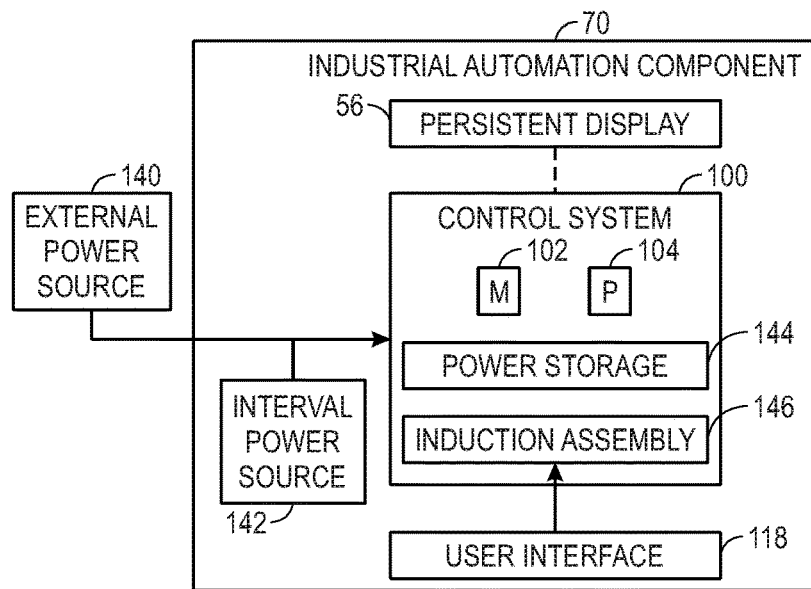
FIG. 4 is a schematic diagram of an embodiment of the industrial automation component having the persistent display shown in FIG. 4, in accordance with an embodiment of the present disclosure.

FIG. 4 is a schematic diagram of an embodiment of the industrial automation component 70 further illustrating the control system 100 of the persistent display 56. In some embodiments, the industrial automation component 70 may receive power from an external power source 140, such as a power generator external to the industrial automation system 50, a battery or other power storage device, an electrical grid, and/or another power source that is not integral to the industrial automation component 70. The power received from the external power source 140 may be used to provide power or a voltage the control system 100 and to enable the control system 100 to operate various aspects or operations of the industrial automation component 70. Accordingly, a portion of the power of the external power source 140 may be used to enable the control system 100 to operate the persistent display 56, such as to change the image data presented by the persistent display 56. The external power source 140 may additionally include induction power received from an external device, such as a mobile device (e.g., a phone, a table, a laptop), that is capable of outputting an induction voltage. That is, the control system 100 may extract power from the induction voltage emitted from the mobile device. In any case, the power provided by the external power source 140 may be used to operate the persistent display 56.

In additional embodiments, the industrial automation component 70 may receive power from a source that is not the external power source 140. For example, the industrial automation component 70 may include an internal power source 142 that may be integral to the industrial automation component 70. The internal power source 142 may, for instance, harvest power from the ambient environment. As an example, the internal power source 142 may include a solar cell that may extract power from solar energy for use by the control system 100 to control the persistent display 56. As another example, the internal power source 142 may include a light collecting cell that may extract power from certain light, such as from a light emitting diode (LED). For instance, the light collecting cell may harvest power from a light emitted from an industrial light and/or a mobile device. As such, the control system 100 may operate the persistent display 56 without having to use power from the external power source 140. In this way, the control system 100 may continue to operate even when power from the external power source 140 is unavailable.

In further embodiments, the industrial automation component 70 may include a power storage device 144 (e.g., a power storage device 144 that is integral to the industrial automation component 70) that may store power, such as power received from the external power source 140, power (e.g., a voltage) received from the internal power source 142, and/or power received from another power source (e.g., pre-charged power during manufacturing of the power storage device 144). The power storage device 144 may include a battery and/or a capacitor to provide a sufficient amount of power to operate the persistent display 76 when the industrial automation component 70 is not actively receiving power from the external power source 140 and/or from the internal power source 142. Thus, the control system 100 may operate the persistent display 76 even though power from the other power sources 140, 142 may be unavailable.

Further still, the industrial automation component 70 may include an induction assembly 146 (e.g., an electromagnetic induction assembly) that may induce a voltage and a current without the industrial automation component 70 having to receive power to operate. Indeed, the induction assembly 146 may be used to enable the control system 100 to adjust the persistent display 56 when the voltage from the external power source 140 and/or from the internal power source 142 is unavailable. For instance, the induction assembly 146 may be integral to the industrial automation component 70, and the user interface 118 may be coupled to the induction assembly 146 such that a user interaction with the user interface 118 generates sufficient power to control the persistent display 56. Indeed, the user interface 118 and the induction assembly 146 may be a part of the same mechanical device that generates a voltage to control the persistent display 56.

In an example, the mechanical device (e.g., the user interface 118) may receive an interaction or an input (e.g., pressing a mechanical button) may cause a magnet of the induction assembly 146 to move relative to (e.g., linearly across) conductive coils of the induction assembly 146 to induce a sufficient voltage that may be used to control the persistent display 56. In another example, the interaction with the user interface 118 may cause the conductive coils to move (e.g., rotate about) relative to the magnet and also induce voltage to control the persistent display 56. In a further example, the user interface 118 and/or the induction assembly 146 may include additional components that may be used to facilitate the induction of a voltage. Indeed, the user interface 118 may include a protrusion that may wind a spring of the induction assembly 146, and unwinding of the spring (e.g., rotation of the spring) may induce the voltage. Additionally, the user interface 118 may be mechanically coupled to a linkage system (e.g., a set of gears) that facilitates induction of the voltage (e.g., by facilitating movement of the magnet, by facilitating rotation of the coil) for controlling the persistent display 56. In any case, voltage generated by the induction assembly 146 may be used to implement the set of charges for the electrodes 112 to present an image data.

In certain embodiments, the power generated by the induction assembly 146 may be transient based on the interaction with the user interface 118. For instance, the induction assembly 146 may cease to generate power when there is no interaction with the user interface 118. In such embodiments, each time the induction assembly 146 generates power (e.g., each time a user interacts with the user interface 118) for supply to the control system 100, the control system 100 may instruct the persistent display 56 to adjust the presented image data. While there is no user interaction with the user interface 118, the persistent display 56 may continue to present the same image data (e.g., without the control system 100 receiving the voltage generated by the induction assembly 146). For example, the user may cause the persistent display 56 to present different image data by interacting with the user interface 118 to generate a voltage for the control system 100 (e.g., even when the control system 100 does not receive power from the external power source 140 and/or from the internal power source 142), and the persistent display 56 may maintain presentation of the image data after the control system 100 receives the voltage generated by the induction assembly 146.

Figure 5:
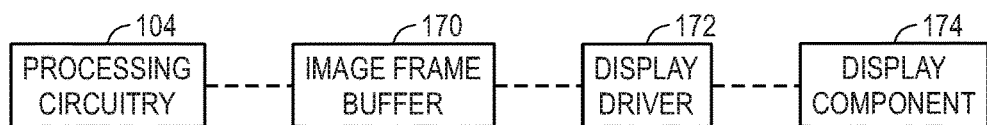
FIG. 5 is a schematic diagram of various components that operate to present image data via the persistent display shown in FIGS. 3 and 4, in accordance with an embodiment of the present disclosure.

FIG. 5 is a schematic diagram of various components that operate the persistent display 56 present image data. As an example, the processing circuitry 104 may be communicatively coupled to an image frame buffer 170, which may be a part of the memory 102 of the control system 100. Upon receiving an indication to instruct the persistent display 56 to present image data (e.g., to change the currently presented image data), the processing circuitry 104 may send corresponding information to the image frame buffer 170 for storage and for use in presenting image data. The information (e.g., binary information) may represent the format of pixels to be displayed to present the image data. A display driver 172 that is communicatively coupled to the image frame buffer 170 may read the formatting of the pixels stored in the image frame buffer 170. Based on the formatting of the pixels, the display driver 172 may communicate with display components 156 of the persistent display 56 to present the associated image data. For example, the display driver 172 may control the charge of the electrodes 112 to position the particles 114 in a desirable arrangement that reflects light and presents particular image data. In this manner, the processing circuitry 104 outputs information that enables the display driver 172 to instruct the persistent display 56 to present corresponding image data based on the information.

Each of FIGS. 6-11 illustrates a respective process for controlling the persistent display 56. Although the present disclosure describes the control system 100 of the industrial automation component 70 as performing the steps of each process, in additional embodiments, a different control system and/or multiple control systems may perform certain steps of any of the processes. It should be noted that each process may be performed differently than depicted in FIGS. 6-11. For instance, additional steps may be performed, and/or certain steps of the processes may be removed, modified, and/or performed in a different order. It should also be noted that any step of one of the processes may be performed in any suitable order relative to a step of another one of the processes. Indeed, the respective steps of the processes may be performed simultaneously with one another and/or sequentially relative to one another. Further still, it should be noted that the processes may be performed to control the persistent display 56 used in a different application (e.g., for a non-industrial automation system).

Figure 6:
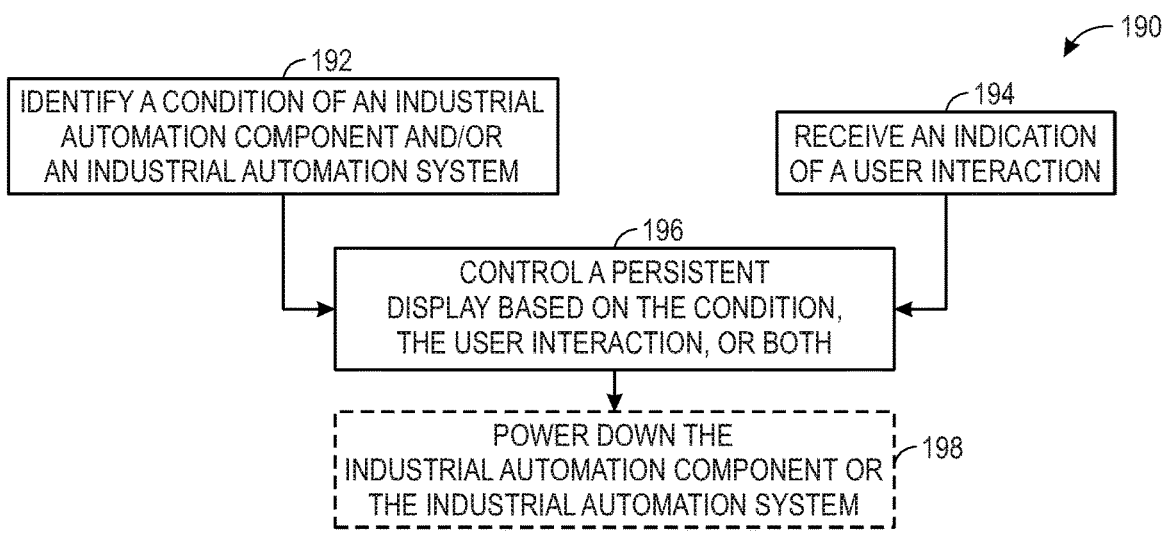
FIG. 6 is a flowchart of an embodiment of a process for controlling a persistent display based on various inputs, in accordance with an embodiment of the present disclosure.

FIG. 6 is a flowchart of an embodiment of a process 190 for controlling the persistent display 56 using various inputs. At block 192, the control system 100 may identify a condition of the industrial automation component 70 and/or of the industrial automation system 50. By way of example, the sensor 116 of the control system 100 may monitor a parameter of the industrial automation component 70 and/or of the industrial automation system 50 and may provide sensor data indicative of the parameter to the control system 100. The control system 100 may therefore identify the parameter based on the received sensor data. Additionally, at block 194, the control system 100 may receive an indication of a user interaction with the industrial automation component 70 and/or with the industrial automation system 50. For instance, a user may interact with the user interface 118, and the control system 100 may receive an input indicative of the user interaction from the user interface 118.

At block 196, the control system 100 may control the persistent display 56 based on the condition identified with respect to block 192, the indication of the user interaction received with respect to block 194, or both. By way of example, the control system 100 may adjust the image data presented by the persistent display 56 based on the condition and/or the user interaction. Indeed, the control system 100 may instruct the persistent display 56 to present updated information based on the condition and/or requested information based on the user interaction to a user, such as to help the user perform an action on the industrial automation component 70 and/or on the industrial automation system 50.

At block 198, the control system 100 may power down the industrial automation component 70 and/or the industrial automation system 50. For example, the control system 100 may block the industrial automation component 70 and/or the industrial automation system 50 from receiving power from the power source 54 or otherwise electrically decouple the power source 54 from the industrial automation component 70 and/or from the industrial automation system 50.

In this manner, the industrial automation component 70 and/or the industrial automation system 50 may not be in operation. However, it should be noted that the persistent display 56 may continue to present information in the powered down state of the industrial automation component 70 and/or of the industrial automation system 50. That is, after the control system 100 has adjusted the persistent display 56 to present the image data, the persistent display 56 may present the image data indefinitely (e.g., until the control system 100 controls the persistent display 56 to present different image data). Accordingly, a user may be able to view the image data presented by the persistent display 56 even when the industrial automation component 70 and/or the industrial automation system 50 is not in operation, thereby continuing to facilitate the user performing certain actions (e.g., maintenance) on the industrial automation component 70 and/or on the industrial automation system 50.

In some embodiments, the control system 100 may instruct the persistent display 56 to provide information associated with operation of the industrial automation component 70 and/or of the industrial automation system 50. Such operational information may include an operating mode, an operating level (e.g., an amount of power consumed), an operating status (e.g., an on/off status, a start/stop status), an operational statistic (e.g., a remaining lifespan), an identification tag information (e.g., an assigned identifier), specification information (e.g., full-load amperage settings), other suitable operational information, or any combination thereof. As such, when the industrial automation component 70 and/or the industrial automation system 50 encounters a fault or error to cause a powered down state, the persistent display 56 may continue to present the operational information that may help with diagnosis of the fault. Indeed, the persistent display 56 may continue to present a previous condition of the industrial automation component 70 and/or of the industrial automation system 50 prior to powering down to facilitate a user performing maintenance.

In additional embodiments, the control system 100 may receive an indication (e.g., based on a user input, based on a maintenance schedule) that the industrial automation component 70 and/or the industrial automation system 50 is to be powered down, such as for modification and/or maintenance. The control system 100 may instruct the persistent display 56 to update in response to receiving the indication. As an example, the control system 100 may instruct the persistent display 56 to update and present specific information (e.g., product information) that facilitates a user performing a desired action without the industrial automation component 70 and/or the industrial automation system 50 in operation. As another example, the control system 100 may instruct the persistent display 56 to present image data to the user to confirm the industrial automation component 70 and/or the industrial automation system 50 has successfully powered down, thereby indicating to the user that further actions may be performed.

In further embodiments, the persistent display 56 may present image data (e.g., a legend, a map) that indicates the functions of certain features of the user interface 118 of the industrial automation component 70 and/or of the industrial automation system 50. In an example, the user interface 118 may be configurable such that the settings of various features (e.g., a touchscreen, a dial, a switch) may be customizable (e.g., manually set) to perform certain operations. That is, the operation effectuated by the features may be changed (e.g., repurposed to adjust an operation). Therefore, control system 100 may receive an indication of a configuration or reconfiguration of the user interface 118 and may update the image data to indicate the function of the features of the user interface 118.

In another example, a particular sequence of interactions with the user interface 118 may effectuate an operation. Therefore, as the control system 100 receives indications that an interaction of the sequence of interactions have been performed, the control system 100 may instruct the persistent display 56 to indicate the operation effectuated by a subsequent interaction. For instance, the control system 100 may receive an indication of a first interaction with a first feature (e.g., a single press of a first button) and may instruct the control system 100 to perform a first operation (e.g., increase an operating level of the industrial automation component 70). Thus, prior to receiving any interaction with the first feature, the control system 100 may instruct the persistent display 56 to indicate that the first operation is effectuated via the first interaction with the first feature. After the first interaction with the first feature, a second, subsequent interaction with the same first feature (e.g., an additional press of the first button) or with a different, second feature (e.g., a press of a second button) may cause the control system 100 to perform a second operation (e.g., reduce the operating level of the industrial automation component 70). As such, after the control system 100 receives the first interaction, the control system 100 may update the persistent display 56 to indicate that the second interaction effectuates the second operation. In this way, a limited number of features may be used to effectuate multiple operations, thereby reducing a number of features needed to enable different operations to be performed, and the persistent display 56 may present image data to help the user determine such operations effectuated by the various interactions.

Furthermore, the control system 100 may instruct the persistent display 56 to adjust a language of presented text. For instance, the control system 100 may receive a user input that indicates a particular language, and the control system 100 may instruct the persistent display 56 to present the text in the particular language in response. Additionally, the sensor 116 may be a location sensor that may determine the geographic location where the industrial automation component 70 and/or the industrial automation system 50 is located. Thus, the sensor 116 may transmit location data to the control system 100, the control system 100 may determine a language associated with the location data, and the control system 100 may instruct the persistent display 56 to present text in the determined language.

Further still, the control system 100 may receive certain communication signals and may control the persistent display 56 based on the communication signals. By way of example, the control system 100 may wirelessly couple to another device (e.g., a computing device) via a communication channel, such as via Bluetooth, near-field communication, Wi-Fi, or another suitable manner. The device may be able to transmit a communication signal, such as a request to display certain information, via the communication channel. Thus, the control system 100 may control the persistent display 56 based on the communication signal received via the communication channel. For example, the communication signal may indicate a request to present information (e.g., maintenance information). In any case, the user may utilize the device to control the persistent display 56 remotely.

In some implementations, the control system 100 may receive an indication that certain information regarding the industrial automation component 70 and/or regarding the industrial automation system 50 has been changed and/or updated, and the control system 100 may update the image data presented by the persistent display 56 based on the indication. For example, the control system 100 may be communicatively coupled to the database 120, certain information stored within the database 120 may be updated, and the control system 100 may receive an indication that such information stored in the database 120 has been updated. As a result, the control system 100 may instruct the persistent display 56 to present updated image data associated with the updated information. For instance, the industrial automation component 70 and/or the industrial automation system 50 may be certified and recertified over time, and new certification data may be generated after each certification for storage in the database 120. The control system 100 may therefore instruct the persistent display 56 to present the new certification data.

The control system 100 may also instruct the persistent display 56 to present information related to various accessories or other functions associated with the industrial automation component 70 and/or associated with the industrial automation system 50. By way of example, the industrial automation component 70 may be equipped with jam and ground fault protection, electronic remote reset, anti-temper shielding, and the like. Such accessories and/or functions may be changed and/or updated over time, and the control system 100 may instruct the persistent display 56 to update the presented display based on the updated accessories and/or functions.

In certain embodiments, the control system 100 may display image data representing an identifier that may enable another device to access additional information associated with the industrial automation component 70 and/or associated with the industrial automation system 50. For example, the control system 100 may instruct the persistent display 56 to display a visualization, such as a quick response (QR) code or a barcode, that may be scanned or acquired by a computing device. Upon scanning the image data, the computing device may retrieve other information, such as the operational information, servicing information, accessory information, a knowledge article or note, a link to a service technician or service center, and so forth, which may be stored in the database 120. Indeed, since the persistent display 56 may continue to present the image data even after the industrial automation component 70 and/or the industrial automation system 50 has been powered down, the user may still have access to the additional information associated with the industrial automation component 70 and/or the industrial automation system 50 by scanning the image data. For instance, the user may utilize such information to perform maintenance, such as to resolve an issue, to reset the industrial automation component 70 and/or the industrial automation system 50, to report an error, to seek assistance or support, to submit a service call, and the like, without the industrial automation component 70 and/or the industrial automation system 50 having to be in operation.

In any case, the control system 100 may instruct the persistent display 56 to cycle through and present any of the aforementioned information based on a user input received via the user interface 118. That is, multiple frames of image data may be readily available for presentation, and the control system 100 may select one of the frames for presentation based on the user input. As an example, the control system 100 may instruct the persistent display 56 to present first information (e.g., operational information) prior to receiving any user input, the control system 100 may receive a first user input that causes the persistent display 56 to present second information (e.g., certification information) instead of the first information, and the control system 100 may receive a second user input that causes the persistent display 56 to present third information (e.g., accessory information) instead of the first information or the second information. In this manner, the persistent display 56 may be able to provide different information on in a limited surface area of display.

Figure 7:
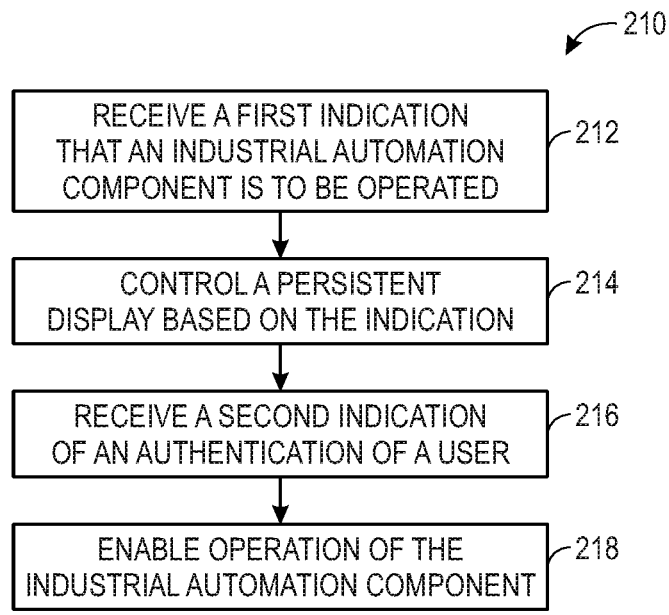
FIG. 7 is a flowchart of an embodiment of a process for authorizing operation of the industrial automation component of FIGS. 1-4 using the persistent display, in accordance with an embodiment of the present disclosure.

FIG. 7 is a flowchart of an embodiment of a process 210 for authorizing operation of the industrial automation component 70 using the persistent display 56. At block 212, the control system 100 may receive a first indication (e.g., via a user input received from the user interface 118, via a communication signal received from a mobile device) that includes a request to operate the industrial automation component 70. For example, the industrial automation component 70 may currently be in a locked state in which the operation of the industrial automation component 70 does not change based on a user input. In response to receiving the first indication, the control system 100 may instruct the persistent display 56 to present different image data to assist with authenticating a user. For example, the persistent display 56 may provide a link and/or a connection to a resource that assists with activation of the industrial automation component and/or registration of the industrial automation component 70 (e.g., with a manufacturer). Additionally, the persistent display 56 may present a key (e.g., a security key, a cryptographic key) that may be used to decrypt data and/or to authenticate use of the industrial automation component 70. At block 216, the control system 100 may receive a second indication confirming authentication of the user (e.g., authentication performed via the information presented by the persistent display 56). By way of example, the user utilizes the information presented by the persistent display 56 to confirm activation of the industrial automation component 70. At block 218, in response to receiving the second indication, the control system 100 may enable operation of the industrial automation component 70. For instance, the second indication may cause the control system 100 to transition the industrial automation component 70 from the locked state to an unlocked state that enables the user to adjust the operation of the industrial automation component 70. As a result, the control system 100 may receive a subsequent user input and may control the operation of the industrial automation component 70 based on the subsequent user input.

Figure 8:
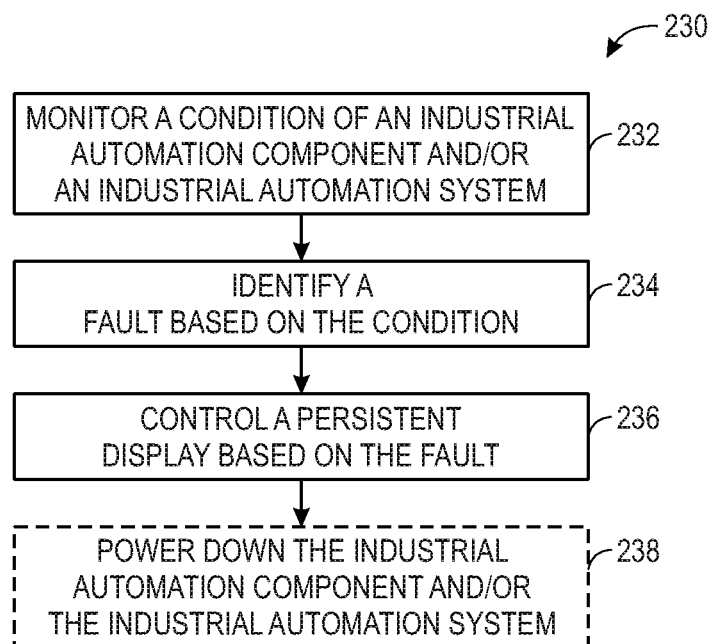
FIG. 8 is a flowchart of an embodiment of a process for controlling the persistent display of FIGS. 3 and 4 based on a fault or error, in accordance with an embodiment of the present disclosure.

FIG. 8 is a flowchart of an embodiment of a process 230 for controlling the persistent display 56 based on a fault or error. At block 232, the control system 100 may monitor a condition of the industrial automation component 70 and/or of the industrial automation system 50. For example, the sensor 116 may monitor an operating parameter, and the control system 100 may receive sensor data indicative of the operating parameter and may determine the condition based on the operating parameter. At block 234, the control system 100 may identify a fault or error based on the condition. For instance, the control system 100 may compare an operating parameter value with a threshold value and may determine that there is a fault or error based on the operating parameter value exceeding the threshold value. At block 236, the control system 100 may control the persistent display 56 based on the identified fault or error. That is, the control system 100 may instruct the persistent display 56 to present information related to the identified fault (e.g., one or more instructions to address the fault or error) to facilitate a user performing maintenance on the industrial automation component 70 and/or on the industrial automation system 50.

In one example, there may be a list of indications or flags that the control system 100 may activate the industrial automation component 70 based on a particularly identified fault. Such indications may, for instance, include a pattern or an arrangement in which the control system 100 may operate a light display (e.g., LEDs). Based on the identified fault, the control system 100 may select a corresponding indication from the list of indication to inform of the identified fault. The control system 100 may also instruct the persistent display 56 to present image data that includes a legend or a code that maps or associates the fault corresponding to the indication of the industrial automation component 70. That is, the image data presented by the persistent display 56 may associate various indications of the list of indications with a corresponding fault to help the user identify the fault corresponding to a particular indication. In an additional example, the control system 100 may instruct the persistent display 56 to present image data (e.g., text) that directly describes the fault. In a further example, the control system 100 may instruct the persistent display 56 to present image data that includes servicing information or instructions associated with the identified fault to help the user address the fault. Further still, the control system 100 may instruct the persistent display 56 to present image data including the visualization that enables a computing device to obtain more additional information (e.g., from the database 120) upon acquiring the visualization. Therefore, a user may obtain information regarding the industrial automation component 70 and/or the industrial automation system 50 even during the occurrence of the fault.

In any case, at block 238, the control system 100 may power down the industrial automation component 70 and/or the industrial automation system 50. However, the persistent display 56 may continue to present information related to the fault, thereby continuing to facilitate maintenance to be performed. Indeed, the control system 100 may dynamically adjust the image data presented by the persistent display 56 based on a most recently identified fault such that information related to the fault is updated prior to the fault affecting operation of the industrial automation component 70 and/or of the industrial automation system 50. In this manner, if the fault causes the industrial automation component 70 and/or the industrial automation system 50 to power down, the user may continue to view information associated with the fault.

In some embodiments, the received sensor data may be indicative of various settings and/or events associated with a fault. By way of example, the sensor data may indicate a sequence of events that may have collectively caused a fault to occur. As such, the control system 100 may update the persistent display 56 to present the sequence of events. Thus, the user may view certain historical information that further facilitates performing diagnosis, troubleshooting, or other actions to address the fault. Indeed, the persistent display 56 may present multiple information that is useful for addressing the fault, such as information regarding the operation and/or integrity of the industrial automation component 70 over time. For instance, if the industrial automation component 70 is transported to a different facility (e.g., a quality control center) for evaluation, the additional information may increase an accuracy and/or an ease of identification and/or handling of the fault.

Figure 9:
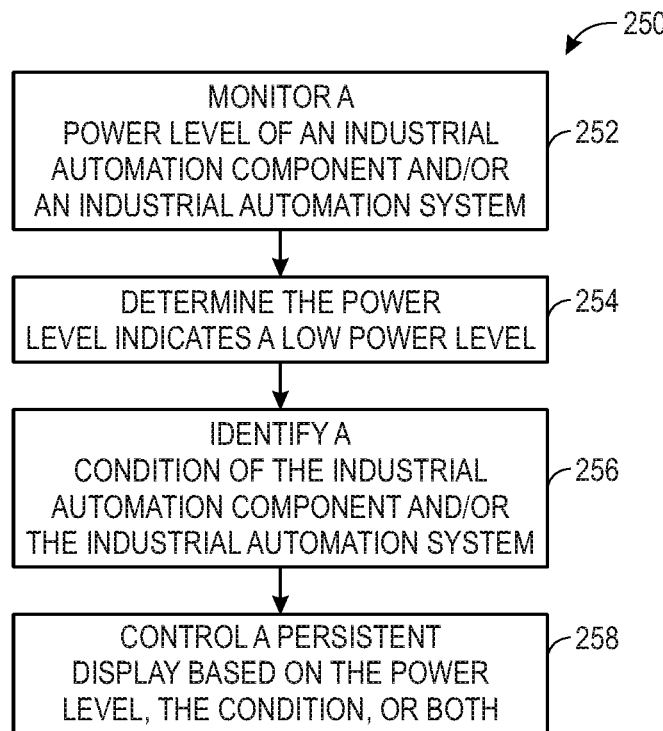
FIG. 9 is a flowchart of an embodiment of a process for controlling the persistent display of FIGS. 3 and 4 based on a monitored power level, in accordance with an embodiment of the present disclosure.

FIG. 9 is a flowchart of an embodiment of a process 250 for controlling the persistent display 56 based on a monitored power level. At block 252, the control system 100 may monitor a power level of the industrial automation component 70 and/or of the industrial automation system 50. By way of example, the sensor 116 may monitor an amount of power received from the external power source 140, an amount of power received from the internal power source 142, an amount of power stored in the power storage 144, or any combination thereof. At block 254, the control system 100 may determine that the power level indicates a low power level. For instance, the control system 100 may compare the power level to a threshold power level (e.g., a threshold voltage level) indicative of an insufficient amount of power for the industrial automation component 70 and/or the industrial automation system 50 to operate, and the control system 100 may determine that the power level indicates a low power level in response to a determination that the power level is within a range the threshold power level. Indeed, the low power level may indicate that the industrial automation component 70 and/or the industrial automation system 50 may not be receiving a sufficient amount of power to operate normally. Such low power affect operation of the industrial automation component 70 and/or the industrial automation system 50, such as by causing the industrial automation component 70 to power down. In certain embodiments, the control system 100 may monitor the amount of power the industrial automation component 70 and/or the industrial automation system 50 is receiving over a period of time. Therefore, the control system 100 may determine a trend of the power being received. The control system 100 may identify the trend is indicative of an impending or a possibly upcoming low power level. As an example, the control system 100 may determine that the power is decreasing at a rate greater than a threshold rate during a block of time. As another example, the control system 100 may determine that the power is below a threshold or desirable power and that the power has not been increasing at a threshold rate (e.g., toward the threshold power) within a threshold block of time.

At block 256, in response to determining the power level indicates a low power level (e.g., a loss of power), the control system 100 may then identify a condition of the industrial automation component 70 and/or of the industrial automation system 50. For instance, the control system 100 may identify a current operating parameter or other information that may be associated with the low power level. Indeed, the control system 100 may identify a potential cause of the low power level. In additional embodiments, the control system 100 may continuously update and/or store information (e.g., by updating the memory 102 and/or another storage component) indicative of the condition of the industrial automation component 70 and/or of the industrial automation system 50. In response to determining the power level indicates a low power level, the control system 100 may identify and retrieve information (e.g., from the memory 102) associated with a most recent condition of the industrial automation component 70 and/or the industrial automation system 50. In further embodiments, the control system 100 may identify a fault or an error associated with the operation of the industrial automation component 70 and/or of the industrial automation system 50. Indeed, the control system 100 may identify a fault or an error that may be causing the low power level.

At block 258, the control system 100 may control the persistent display 56 based on the power level monitored with respect to block 252, the condition identified with respect to block 256, or both. As an example, the control system 100 may instruct the persistent display 56 to present image data indicative of an amount of power currently being supplied, an amount of stored power remaining, an amount of operating time remaining before operation is powered down, an identified fault that may be causing the low power level, or other information associated with the power level. As another example, the control system 100 may instruct the persistent display 56 to present image data indicative of the identified condition (e.g., a previous operation of the industrial automation component 70), such as to help a user with performing maintenance (e.g., to address an identified fault). As a further example, the control system 100 may instruct the persistent display 56 to present image data that includes the visualization that may be acquired by a computing device to obtain additional information. In any case, the image data presented by the persistent display 56 may inform a user that the industrial automation component 70 and/or the industrial automation system 50 is currently operating at a lower power level, and/or the image data presented by the persistent display 56 enable information to be provided to address the low power level (e.g., to perform maintenance).

In some embodiments, power from a primary power source (e.g., from the external power source 140) may drive operation of the industrial automation component 70 and/or the industrial automation system 50. The control system 100 may cause the persistent display 56 to update an image data after the power from the primary power source is unavailable. That is, the control system 100 may be able to cause the persistent display 56 to update the image data while the industrial automation component 70 is not in operation. For instance, after the power from the primary power source is not available, a secondary power source (e.g., the internal power source 142, the power storage 144) may provide power, such as a voltage, to the control system 100 to enable the control system 100 to update the image data. By way of example, the power provided by the secondary power source may enable the control system 100 to identify the condition of the industrial automation component 70 and/or of the industrial automation system 50 (e.g., by retrieving the condition from the memory 102), and the control system 100 may use the power to cause the persistent display 56 to update the image data based on the condition. Therefore, the persistent display 56 may update the image data even after the power from the primary power source is unavailable and to maintain presentation of the updated image data.

FIG. 10 is a flowchart of an embodiment of a process 270 for controlling the persistent display 56 based on an operation of a different industrial automation component. At block 272, the control system 100 may monitor an operation of a first industrial automation component (e.g., the industrial automation component 70). At block 274, the control system 100 may identify a fault based on the monitored operation. At block 276, the control system 100 may control the persistent display 56 of a second industrial automation component (e.g., an industrial automation component coupled to the industrial automation component 70) based on the fault identified with respect to the operation of the first industrial automation component.

In some embodiments, the control system 100 may determine that a current operation of the first industrial automation component does not match with an expected or a target operation of the first industrial automation component. Thus, the control system 100 may determine that there is a fault associated with the first industrial automation component causing the unexpected operation of the first industrial automation component, and the control system 100 may instruct the persistent display 56 of the second industrial automation component to indicate that there is a fault associated with the first industrial automation component. In this manner, the persistent display 56 of the second industrial automation component may be used to indicate faults associated with any industrial automation component of the industrial automation system 50 and/or of another industrial automation system. For example, an industrial automation component that is positioned exterior to the enclosure 52 may indicate a fault of an industrial automation component that is positioned within the enclosure 52. As such, the persistent display 56 may inform the user of faults without the user having to open the enclosure 52, thereby guiding the user to identify faults more easily.

Indeed, the control system 100 may coordinate multiple persistent displays to present image data that guides or facilitates the user identifying a fault. In an example, the control system 100 may cause each persistent display to indicate the industrial automation component experiencing the fault. As such, the user may be informed of the fault upon viewing any of the persistent displays of the industrial automation system 50. In another example, each persistent display may be associated with or located on a respective industrial automation component, and the control system 100 may cause each persistent display to render respective image data that indicates a position of the respective industrial automation component relative to the particular industrial automation component experiencing the fault. In a further example, the control system 100 may cause each persistent display to present information related to the respective industrial automation component based on the fault. For instance, the control system 100 cause each persistent display to present a servicing instruction to be performed on the corresponding industrial automation component in order to address the fault, such as a first action to be performed on a first industrial automation component and a second action to be performed on a second industrial automation component. The user may follow each of the instructions provided by the persistent displays to address the fault.

Additionally, the control system 100 may identify that the operation of the first industrial automation component is indicative of a fault associated with the second industrial automation component. In other words, the fault associated with the second industrial automation component is causing the first industrial automation component to operate unexpectedly. In this manner, the control system 100 may identify the fault associated with the second industrial automation component without having to monitor the operation of the second industrial automation component (e.g., instead by only monitoring the operation of the first industrial automation component). As a result, the control system 100 may instruct the persistent display 56 to present information indicating that the fault associated with the second industrial automation component (e.g., rather than a fault associated with the first industrial automation component) is causing the first industrial automation component to operate unexpectedly.

Similarly, the control system 100 may instruct the persistent display 56 to present information other than faults associated with various industrial automation components. That is, the persistent display 56 of the first industrial automation component may present any suitable information associated with the second industrial automation component. Indeed, a single persistent display 56 may present information associated with any of the industrial automation components of the industrial automation system 50 and/or of other industrial automation system 50. As such, in the event that one or more industrial automation components are powered down, the user may still be able to view information regarding the industrial automation component (s) via a single persistent display 56.

FIG. 11 is a flowchart of an embodiment of a process 290 for controlling the persistent display 56 of the industrial automation component 70 based on connections between industrial automation components of the industrial automation system 50. At block 292, the control system 100 may monitor a connection between various industrial automation components of the industrial automation system 50. For instance, the control system 100 may monitor physical connections (e.g., wiring) between industrial automation components and/or network traffic (e.g., data flow) between industrial automation components to monitor wireless connections between industrial automation components. At block 294, the control system 100 may determine a change in the connection between the industrial automation components. For example, the control system 100 may determine that an additional industrial automation component has been added to the industrial automation system 50 based on an identification that an additional wired or wireless connection has been implemented onto one of the industrial automation components of the industrial automation system 50 (e.g., based on a newly identified wire coupling, based on data flow to a new device). At block 296, the control system 100 may control the persistent display 56 based on the determined change in the connection between the industrial automation components.

In certain embodiments, the control system 100 may instruct the persistent display 56 to present information associated with each of the components within the industrial automation system 50. Thus, when the control system 100 determines that there is a change or an update to the connection between the industrial automation components, the control system 100 may update the image data presented by the persistent display 56 to reflect the change. For example, the control system 100 may instruct the persistent display 56 to indicate that an additional industrial automation component has been added to the industrial automation system 50 and/or that one of the industrial automation components has been removed from the industrial automation system 50. The control system 100 may additionally instruct the persistent display 56 to update the image data to provide further information associated with the additional industrial automation component that has been added to the industrial automation system 50. Indeed, the control system 100 may instruct the persistent display 56 to provide updated information associated with the industrial automation system 50, such as operational information, specification or product information, and so forth, of each industrial automation component in the industrial automation system 50 based on the connection between the industrial automation components.

As an example, each industrial automation component in the industrial automation system 50 may be assigned a specific identifier that is presented by the persistent display 56. For instance, a naming convention, protocol, or system may be used to assign a particular identifier to each industrial automation component in the industrial automation system 50, such as based on an associated assembly, factory, work area, or other grouping associated with the industrial automation system 50 and/or based on an aspect associated with the industrial automation component, such as type of device, a location within the industrial automation system 50, a connection with another industrial automation component, and the like. Indeed, the control system 100 may automatically generate identifiers for particular industrial automation components (e.g., based on input information associated with the industrial automation component), and the control system 100 may instruct the persistent display 56 to update the image data based on the generated identifier. By way of example, as additional industrial automation components are added within the enclosure 52 of the industrial automation system 50, the control system 100 may instruct the persistent display 56 to display the identifiers of the additional industrial automation components.

Additionally, the control system 100 may identify faults associated with the connection between various industrial automation components. For example, the control system 100 may determine that certain industrial automation components are not successfully communicating with one another (e.g., based on a lack of data flow between the industrial automation components). As such, the control system 100 may instruct the persistent display 56 to indicate the identified faults and to inform the user of such faults. Indeed, the persistent display 56 may indicate that the fault is associated with the connection between the industrial automation components rather than directly with one of the industrial automation components itself.

In some implementations, certain industrial automation components within the industrial automation system 50 may be a part of a subnetwork. That is, the industrial automation system 50 may have a network that includes at least some of the industrial automation components of the industrial automation system 50. The network may be further divided into various subnetworks that each may include a subset of the industrial automation components. Each of the subnetworks may include respective subnetwork information, such as a respective subnetwork address. Thus, the control system 100 may instruct the persistent display 56 to present subnetwork information based on the relationship between the industrial automation components and the subnetworks. For example, each industrial automation component of a particular subnetwork may be coupled to one another via a ribbon cable, and the control system 100 may identify that an industrial automation component of the particular subnetwork is not successfully communicating with other industrial automation components of the particular subnetwork via a respective ribbon cable. The control system 100 may therefore instruct the persistent display 56 to present image data that indicates a possible fault associated with the connection within the particular subnetwork. Further, as additional industrial automation components are added and connected to a subnetwork, the control system 100 may update the subnetwork information presented by the persistent display 56, such as to add, remove, or otherwise change information associated with the subnetwork.

Indeed, any of the techniques described above regarding instructing the persistent display 56 to present image data may be based on information associated with industrial automation components of the same network and/or subnetwork. For instance, the control system 100 may monitor the condition of each industrial automation component of the same subnetwork. The control system 100 may then instruct the persistent display 56 to present image data based on any of the monitored conditions, such as based on an operating parameter associated with any of the industrial automation components, a fault associated with any of the monitored conditions, a sequence of events associated with any of the monitored conditions, servicing information associated with any of the industrial automation components, and so forth. In this manner, the image data presented by the persistent display 56 may better reflect an entirety of the network or subnetwork.

As set forth above, the present disclosure provides technical benefits for an industrial automation component and/or an industrial automation system. For example, a persistent display may maintain presentation of image data or visualizations without consuming or otherwise using energy, such as electrical energy. As such, even when energy is limited or unavailable (e.g., during a powered down state), a user may continue to view the image data presented by the persistent display. Indeed, such image data may include operating information, product information, servicing information, fault information, flags, and the like. As an example, a control system may monitor an operating parameter and/or a condition of the industrial automation component and/or the industrial automation system to adjust the image data presented by the persistent display. Indeed, the control system may determine a possible fault based on detected parameters and may cause the persistent display to present information associated with the fault. Thus, the user may continue to view information associated with the fault, even if the fault affects operation of the industrial automation component and/or the industrial automation system. The control system may utilize energy to cause the persistent display to adjust presented image data. In some embodiments, the control system may include an induction assembly, which may be coupled (e.g., mechanically coupled) to a user interface. A user interaction with the user interface may cause the induction assembly to generate a sufficient amount of energy that enables the control system to adjust the image presented by the persistent display. In this way, the control system does not require an additional or a separate energy source in order to control the persistent display.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    an electrical enclosure;
    an industrial automation component disposed within the electrical enclosure, wherein the industrial automation component is configured to receive external power from an external power source to perform an operation;
    a display configured to maintain presentation of image data in absence of the external power being received by the industrial automation component from the external power source wherein the display comprises a plurality of electrodes positioned at opposite sides of a container enclosing one or more charged particles submerged within a fluid; and
    a control system communicatively coupled to the industrial automation component and to the display, wherein the control system is configured to perform operations comprising:

receiving an indication that the external power is within a range of a threshold, wherein the threshold is associated with an insufficient amount of power for the industrial automation component to operate;

identifying an error associated with the industrial automation component in response to receiving the indication; and using at least a portion of the external power received by the industrial automation component to adjust a set of charges of the plurality of electrodes of the display to adjust one or more positions of the charged particles within the container to cause the display to render image data indicative of the error.

2. The system of claim 1, wherein the image data rendered by the display is indicative of one or more instructions for addressing the error.

3. The system of claim 1, wherein the image data rendered by the display comprises a visualization configured to cause a computing device to access a database to retrieve information associated with the error.

4. The system of claim 3, wherein the visualization comprises a quick response code or a barcode.

5. The system of claim 1, comprising a storage component accessible by the control system, wherein the control system is configured to perform operations comprising:

continuously updating the storage component to indicate a condition of the industrial automation component;

retrieving the condition of the industrial automation component from the storage component in response to receiving the indication; and causing the display to render updated image data based on the condition.

6. The system of claim 5, comprising a power storage device, wherein the control system is configured to perform operations comprising:

receiving a voltage from the power storage device when the external power is unavailable;

using the voltage to retrieve the condition of the industrial automation component from the storage component; and using the voltage to cause the display to render the updated image data based on the condition.

7. An industrial automation component, comprising:

a display configured to render image data and to maintain presentation of the image data in absence of power; and a control system communicatively coupled to the display, wherein the control system is configured to use power from a power source to perform operations comprising:

identifying an error associated with the industrial automation component;

causing the display to render the image data based on the error, wherein the image data comprises a visualization configured to cause a computing device, upon acquiring the image data, to access a database to retrieve information associated with the industrial automation component;

determining that the power from the power source is within a range of a threshold; and causing the display to render the image data comprising the visualization in response to determining the power from the power source is within the range of the threshold.

8. The industrial automation component of claim 7, wherein the visualization comprises a QR code or a barcode.

9. The industrial automation component of claim 7, wherein the control system is configured to perform operations comprising:

using the power from the power source to control one or more operations of the industrial automation component; and using the power from the power source to adjust the image data rendered by the display.

10. The industrial automation component of claim 7, wherein the control system is configured to perform operations comprising powering down the industrial automation component to electrically decouple the industrial automation component from the power source, and wherein the display is configured to maintain presentation of the image data while the industrial automation component is powered down.

11. The industrial automation component of claim 7, wherein the control system is configured to perform operations comprising:

identifying an additional error associated with an additional industrial automation component separate from the industrial automation component; and causing the display to render additional image data based on the additional error.

12. A system, comprising:

a plurality of industrial automation components;

a plurality of displays, wherein each display of the plurality of displays is configured to render image data and to maintain presentation of the image data in absence of power; and a control system configured to receive external power from an external power source to drive operation of at least one of the plurality of industrial automation components, wherein the control system is configured to perform operations comprising:

identifying an error associated with an industrial automation component of the plurality of industrial automation components;

using the external power to coordinate a set of the plurality of displays to render respective image data based on the error associated with the industrial automation component, wherein each display of the set of the plurality of displays is associated with a respective industrial automation component of the plurality of industrial automation components; and causing each display of the set of the plurality of displays to render the respective image data comprising a position of the respective industrial automation components relative to the industrial automation component associated with the error.

13. The system of claim 12, wherein the respective image data rendered by each display of the set of the plurality of displays comprises an instruction related to the respective industrial automation component associated with the display.

14. A system, comprising:

an electrical enclosure;

an industrial automation component disposed within the electrical enclosure, wherein the industrial automation component is configured to receive external power from an external power source to perform an operation;

a display configured to maintain presentation of image data in absence of the external power being received by the industrial automation component from the external power source; and a control system communicatively coupled to the industrial automation component and to the display, wherein the control system is configured to perform operations comprising:

receiving an indication that the external power is within a range of a threshold, wherein the threshold is associated with an insufficient amount of power for the industrial automation component to operate;

identifying an error associated with the industrial automation component in response to receiving the indication;

causing the display to render image data indicative of the error;

monitoring a trend of the external power over a block of time;

determining the trend indicates that the external power is decreasing at a rate that is greater than a threshold rate during the block of time; and identifying an additional error associated with the industrial automation component in response to determining the trend indicates that the external power is decreasing at the rate greater than the threshold rate.

15. An industrial automation component, comprising:

a display configured to render image data and to maintain presentation of the image data in absence of power; and a control system communicatively coupled to the display, wherein the control system is configured to use power from a power source to perform operations comprising:

identifying an error associated with the industrial automation component;

causing the display to render the image data based on the error, wherein the image data comprises a visualization configured to cause a computing device, upon acquiring the image data, to access a database to retrieve information associated with the industrial automation component;

monitoring a connection between the industrial automation component and an additional industrial automation component;

identifying an additional error based on the connection; and causing the display to render the image data based on the additional error.

16. A system, comprising:

a plurality of industrial automation components;

an enclosure;

a plurality of displays, wherein each display of the plurality of displays is configured to render image data and to maintain presentation of the image data in absence of power; and a control system configured to receive external power from an external power source to drive operation of at least one of the plurality of industrial automation components, wherein the control system is configured to perform operations comprising:

identifying an error associated with an industrial automation component of the plurality of industrial automation components; and using the external power to coordinate a set of the plurality of displays to render respective image data based on the error associated with the industrial automation component, wherein the set of the plurality of displays comprises a first subset of displays positioned external to the enclosure, and the set of the plurality of displays comprises a second subset of displays positioned internal to the enclosure.

* * * * *